May 12, 1964 W. R. BOWEN 3,132,381
PLASTIC MOLDING MACHINE
Filed April 6, 1961 2 Sheets-Sheet 1

INVENTOR.
WILLIAM R. BOWEN
BY
*Kenyon & Kenyon*
ATTORNEYS

May 12, 1964   W. R. BOWEN   3,132,381
PLASTIC MOLDING MACHINE
Filed April 6, 1961   2 Sheets-Sheet 2
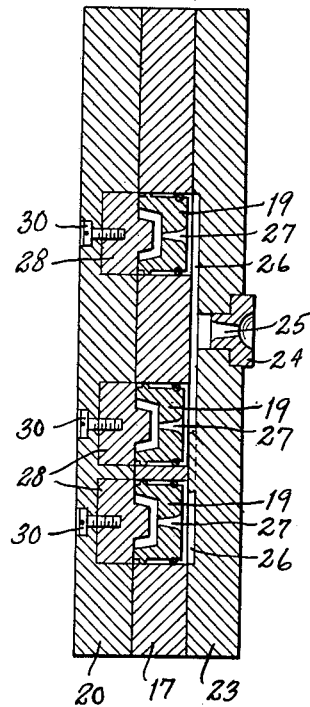
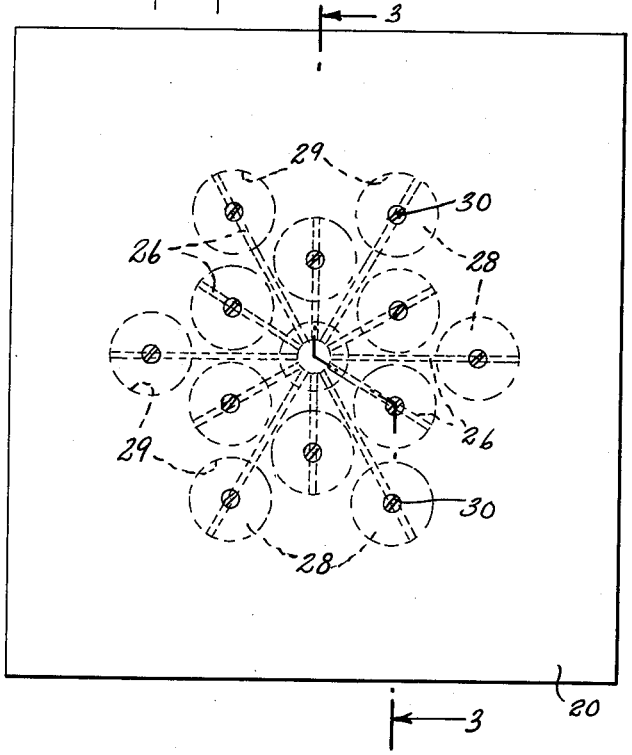
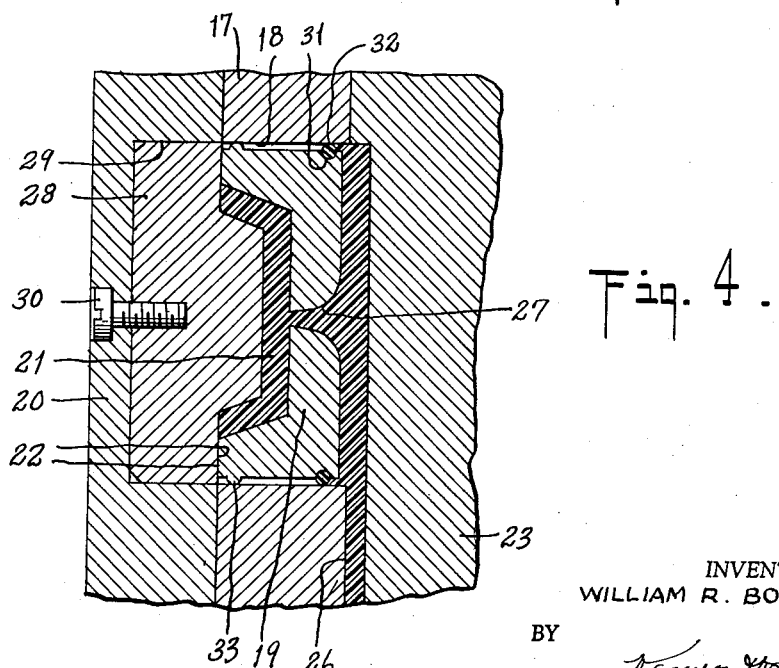
INVENTOR.
WILLIAM R. BOWEN
BY
ATTORNEYS United States Patent Office 3,132,381
Patented May 12, 1964

3,132,381
PLASTIC MOLDING MACHINE
William R. Bowen, Orange, Conn., assignor to Farrel Corporation, a corporation of Connecticut
Filed Apr. 6, 1961, Ser. No. 101,274
8 Claims. (Cl. 18—30)

This invention relates to a plastic molding machine for injecting plastic into a closed mold under pressure to simultaneously produce a plurality of molded shapes.

It is desirable to make a machine of the above kind with a multi-cavity mold formed by parts which are separable to permit the removal of the molded shapes and constructed so that the shapes are produced substantially free from flash even when the plastic injected into this mold is a thermosetting natural or synthetic rubber compound. It is not too difficult to design such a machine, including the mold, when only a single cavity is involved so as to produce only one shape at a time.

However, the provision of a multi-cavity mold arrangement has heretofore been effected only by resorting to unusual designs which have taxed mold-makers' skill so severely that only a few of the persons engaged in this art are capable of producing satisfactory results. In addition to this objection, the mold parts used cannot be easily refinished when worn by service, they must be completely interchanged with other parts of equal cost when different shapes must be molded, and their design inherently involves an objectionable plastic scrap loss.

The object of the present invention is to avoid the above obviously objectionable features while at the same time providing for the simultaneous molding of a plurality of shapes in a multi-cavity mold arrangement in a manner satisfactorily producing flashless molded shapes. It is desired to attain this object even though the plastic is injected into the cavities under high pressure while possessing the viscosity and other characteristics which make natural and synthetic rubber compounds so difficult to handle under such circumstances.

Briefly stated, the above object is achieved by a plastic molding machine including a plurality of cylinders each containing a reciprocative piston and having a first cylinder head for one end. In each instance the adjacent end of the piston and this cylinder head are formed to cooperatively form a single mold cavity surrounded by portions which seal together when the piston is pressed towards this cylinder head. A second cylinder head is provided for the other end of each cylinder and it confines a space open to the end of the piston in this cylinder which is adjacent to this second head. Therefore, fluid plastic under pressure introduced to any space causes the corresponding mold cavity to seal in each instance.

Now using a single source of plastic under pressure, means are provided for feeding this plastic to all of the previously mentioned spaces, with these spaces interconnecting whereby to press all of the pistons substantially simultaneously towards their first cylinder heads with substantially the same force in each instance, to thereby use the plastic pressure to seal each cavity. Each piston has an axially extending passage formed through it and therefore this plastic when supplied in adequate volume is transferred to the cavity within the confines of the sealed portions in each and every instance.

The foregoing fundamental or general principle provides, in a single machine, somewhat the effect of a plurality of individual miniature transfer molding machines excepting that the plastic under pressure is obtained from any single source.

Because of the above, any person of ordinary skill in the art of designing and making molds for transfer molding and injection molding machines can produce this new construction. Once seen, its operation is easily understood.

The invention includes a number of features directly contributing to the successful application of the fundamental or general principle which has been described, as will be understood from the following description of what is now believed to be the best mode of making and using this invention.

Referring to the accompanying drawings;

FIG. 2 is a side view of the left hand one of the plates shown between the platen and clamp of the machine in FIG. 1;

Figure 1:
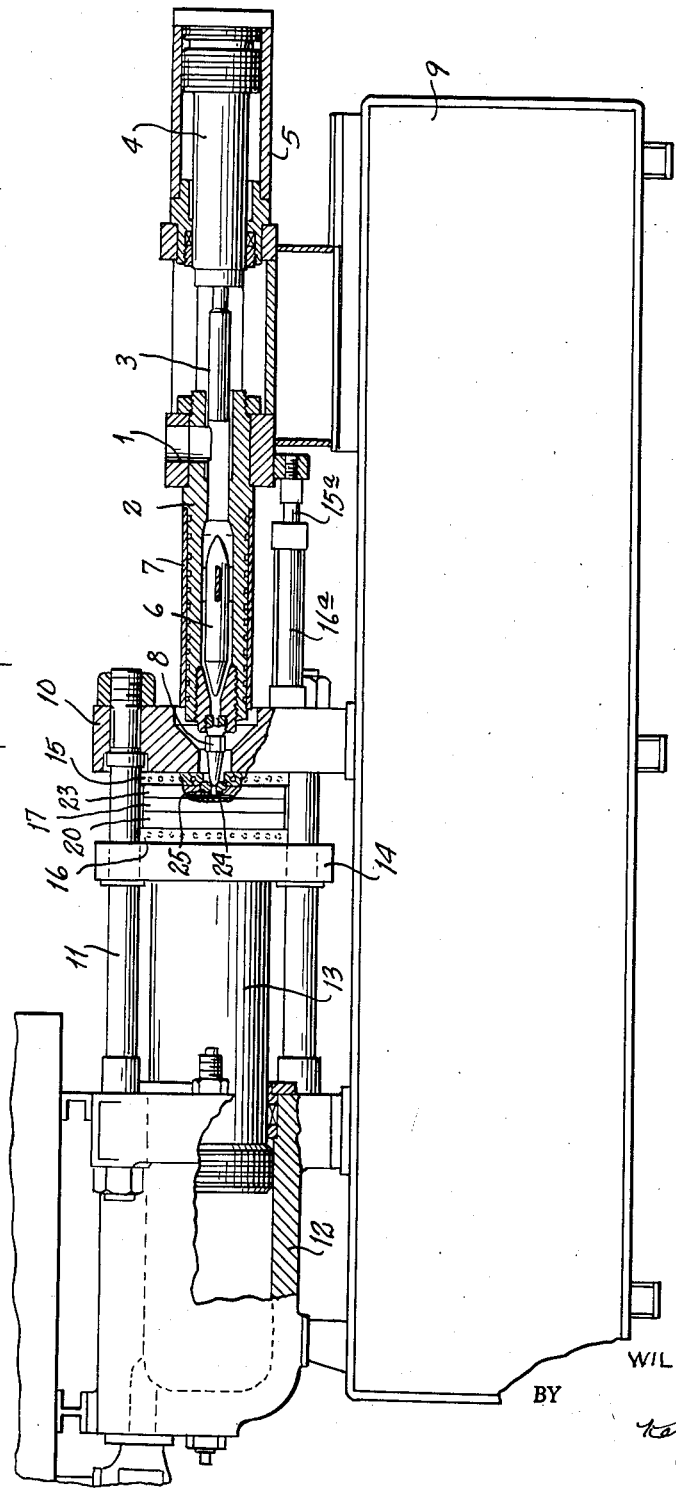
FIG. 1 is a side elevation with a substantial number of the parts in vertical cross-section, showing the invention when used with or in the form of a plastic injection molding machine of the horizontal type, this figure being limited to the parts required to explain the invention.

FIG. 3 shows all of the above mentioned plates in cross-section, the cross-sectioning being taken on the line 3—3 in FIG. 2, this figure showing the parts with the mold cavities and plastic passage means empty; and FIG. 4 is a greatly enlarged segment taken from FIG. 3 and in this instance showing the cavity filled with plastic as well as the passage means which passes the plastic to the cavity from the injection cylinder of the machine shown in FIG. 1, whereby to illustrate in detail the action of the present invention.

This illustrated machine is made in the form of an injection molding machine. The plastic, which may be thermosetting natural or synthetic rubber compound, is introduced through a loading port 1 to a cylinder 2 through which it is pushed forwardly by a plunger 3 worked by a double acting hydraulic ram 4 reciprocating in a cylinder 5. With successive reciprocations of the plunger 3, the plastic is pumped forwardly over a spreader 6 while receiving heat from heating means 7 which heats the cylinder in its portion containing the spreader 7. The forward end of the cylinder 2 is provided with an injection nozzle 8. The spreader and nozzle may be heated if desirable.

All of the parts described so far are in the form of a unit longitudinally slideably mounted on a base 9. A vertical platen 10 is immovable fixed to this base 9 and provides a central passage through which the nozzle 8 may be projected upon forward motion of this unit. Horizontal tension rods 11 connect the platen 10 with a horizontal clamp cylinder 12 in which a horizontal clamp ram 13 reciprocates so as to move a heavy vertical plate 14, which is a clamp towards and from the immovable platen 10. This cylinder 12 is immovably mounted on the base 9.

The description so far is that of a typical horizontal injection molding machine. Such a machine would ordinarily be used to injection mold thermoplastic plastics. The usual two-part, mold, formed by two plates which when fitted together provide the mold cavity, would be pressed between the platen 10 and clamp 14, the latter being pushed forwardly by its ram to clamp the mold close. Then the previously described injection unit would be moved forwardly by means of a horizontal double acting ram 15a connected to the unit and working in a cylinder 16a connected to the platen 10, to bring the nozzle 8 into sealing engagement with the sprue formed in the mold clamped together as described. The mold would be cooled and the rapid setting of the thermoplastic plastic would prevent flash between the parting surfaces of the mold.

On the other hand, if the plastic is a thermosetting natural or synthetic rubber compound, the mold must be heated to set and cure the material. Such a material may be introduced to the cylinder 2 in a heated and plasticized condition, or the heating means 7 alone may be relied on for this same purpose, or both expedients may be used. In any event, temperature and time are critical factors since the material must be fluid when injected into the mold, the heat applied to the mold then setting and curing the compound. Prior to setting, the material is fluid and has such a low viscosity as to introduce the possibility of flashing.

Flashing can be prevented only by sealing together the portions surrounding the mold cavity involved, these portions necessarily being formed by separable parts to permit removal of the molded shape after it is set and cured. This flashing problem is inherent in the case of both injection molding machines and transfer molding machines. In either case, when a single cavity is involved the mold parts may be machined to form surfaces which interseal adequately under the clamping pressure applied to hold the parts together. It is not impossible to align the parts so that such adequate sealing is effected.

But in the case of multi-cavity molds there are the additional surfaces or portions between the various cavities which must also be sealed adequately if flashless shapes are to be produced. Even if precision finishing methods are used with their attendant great expense, wear soon destroys the precision so that flashing then occurs.

The initially described fundamental principles are applied in the case of the illustrated machine to provide a practical and workable solution without involving unusual design or construction problems.

The mold proper is made from three plates which may be sandwiched together between the platen 10 and clamp 14. The setting and curing heat may be provided by heated plates 15 and 16 respectively located between the platen 10 and the sandwiched plates and the clamp 14 and these plates.

Referring now to the mentioned three plates, of these a first plate 17 has bores 18 formed transversely therethrough to form the previously described cylinders. The described pistons 19 are reciprocatively arranged in these cylinders 18, one piston for each cylinder, and the first cylinder head for the cylinders 18 is provided for all of them by a second plate 20. In each instance the adjacent end of the piston 19 is formed to cooperate with the cylinder head formed by the plate 20 to form a mold cavity 21 surrounded by the portions 22 which seal together when the piston 19 is pressed toward the plate 20.

The second cylinder head for the other end of each cylinder is formed by a third plate 23 provided with a sprue bushing 24, in which the nozzle 8 may fit, and having an axially extending passage 25 through which the compound may be injected. The inner face of this third plate 23 has runners 26 formed in it which extend from the sprue bushing passage 25 to and over each of the cylinders 18 opposite to the ends of the pistons 19 adjacent to the plate 23. Thus all of the second cylinder heads are interconnected with each other and with the passage 25.

All three of the plates 17, 20 and 23 are made heavy and rigid in the same manner that conventional mold plates are made. When in use these plates cannot and do not flex. Each piston 19 is made very slightly shorter than the thickness of the plate 17 having the bores 18 forming the cylinders to permit its slight reciprocation as required for the sealing. The interfaces of the plates 17 and 23 completely intercontact throughout, excepting for the spaces defined by the runners 26 formed on the inner face or surface of the plate 23 to which the plastic is fed by the passage 25 formed to extend through the plate 23.

It can be seen that in each instance the sealing surfaces 22 may be finished in the same manner as is done in the case of a single cavity mold. The finish, in the usual fashion, should permit intersealing against the escape of the fluid compound injected into the mold under the pressure received from the plunger 3, while at the same time providing for the necessary escape of air in the mold.

The pressure on the plastic compound applied by the plunger 3 is first applied to the tops of the various pistons 19 so as to force the surfaces 22 together, the plastic feeding through the various runners 26 from the sprue bushing passage 25 being first applied to move each of the pistons 19. Thereafter the compound is injected into the cavity 21 because each of the pistons 19 is provided with the axially extending passage 27 which connects the slight space between each piston and the plate 23, with the mold cavity 21 formed by the shape of the other end of the piston.

Plainly, the sealing pressure applied to the surfaces 22 must increase in proportion to the pressure applied to the compound to force it between these surfaces, and the pressure is equalized between the piston. At the same time, the amount of compound lost as scrap with each molding operation is limited to the relatively small pads on top of each of the pistons 19 and the material in the runners 26. These runners are made no larger than is required to pass the plastic. This reduction of scrap loss is in the case of a thermosetting material of particular importance because it cannot be easily reprocessed as is commonly done in the case of thermoplastic materials.

Another advantage is that when a set of the sealing surfaces 22 do wear, the one of these surfaces provided by the piston 19 in each instance can be renewed simply by replacing the piston by another that has either been refinished or is new. The other of the surfaces 22 is formed in each instance by an insert 28 which fits in a recess 29 formed in the plate 20. Each insert 28 is retained in its working position by one or more cap screws 30 which are, of course, releaseable. It follows that each mold cavity has its individual sealing surfaces formed by the assembly comprised by the piston 19 and the insert 28, and that anyone of these assemblies may be removed and replaced at any time without disturbing the others. This is not only important in connection with maintaining the desired flashless molding operation, but also because it permits easy changing of the mold cavity shapes whenever desired. Obviously different pistons and inserts forming different cavity shapes may be substituted.

If the pistons 19 had a tight sliding fit with their respective cylinders it might be possible for the pistons to bind because of thermal expansion effects resulting from the temperatures to which the mold parts are heated to set and cure the molded compound and the heat of the latter. This is avoided by making the pistons slightly smaller than their cylinders to provide a circumferential clearance in each instance. Merely by way of example, this clearance may range from .001 to .003 of an inch. This clearance prevents possible binding but opens a flow passage to the plastic material. This passage, however, is closed in each instance by forming a shallow peripheral recess 31 near the top of the piston, and locating therein an O-ring 32. These sealing elements are commercially available, are well-known, and may be obtained made from elastically deformable material, permitting the characteristic O-ring sealing action, but having a composition adequately resistant when operating under the temperatures required to set and cure natural and synthetic rubber thermosetting compounds.

The slight clearance between each piston and its cylinder introduces the problem of accurately registering the cavity shape formed in each piston with respect to the cooperating cavity surface formed by the insert 28. Such possible loss of accuracy is prevented by forming an annular rib 33 peripherally around each of the pistons adjacent to its end which opposes the plate 20 and the corresponding insert 28. This rib has a sliding fit with the piston but the clearance is very slight, an example being a clearance in the order of .00025 of an inch. Because this annular rib or ring is made with a transversely convex surface, it engages the cylinder wall along a line. This has two advantages. First, even when thermal expansion effects prevail, the line contact with the cylinder wall keeps very low the frictional restraint holding the piston against motion, the plastic pressure being quite adequate to move the piston to effect the previously described sealing action under all circumstances. Secondly, since the O-ring is elastically flexible, the rib 33 in each instance acts like a fulcrum about which the piston can slightly rock or tilt. Therefore, when the piston is pushed tightly against its cylinder head by the plastic under pressure acting on its other end, the piston can rock slightly as required to effect accurately mating of the surfaces 22 to thereby assure flashless sealing of these surfaces.

Plainly, the sprue bushing passage 25 and the runners 26 provide a passage connecting the inside of the cylinder 2 with each of the axially extending passages 27 formed in each piston. Everything is rigid and free from flexure under either the mold clamping pressure or the plastic pressure. This means that everything may be designed in accordance with recognized engineering handbook principles.

Now, although not illustrated, passage could, if desired, be formed directly through the plate 23 so as to connect each of the cylinders with the outside of the plate 23. In other words, the passage 27 would, in effect, be continued straight through the plate 23. This arrangement would permit the plate sandwich forming the mold, to be fitted with a large cylinder common to all of the cylinders and presses in an ordinary transfer molding press so as to obtain all of the advantages previously indicated excepting that, of course, the plastic scrap loss would then be large to the extent of the mat that would be left between the top of the plate 23 and the plunger of the compressing molding machine against which the plate sandwich would be pressed during the transfer molding operation.

An advantage not previously indicated is that as to each of the pistons 19, the full force developed by its piston area is useful in applying the sealing pressure between the surfaces 22 when the fluid plastic under pressure is introduced through the runners 26 or other passages. No force is lost by deflecting elastic metal parts or springs. The sealing pressure can be accurately predetermined by the known pressure applied to the plastic and the known piston area of each piston 19. These advantages are obtained only by using the rigid cylinder and reciprocating piston arrangement characteristic of the present invention.

It is to be understood that after each molding operation, the clamp 14 is retracted and the plates 15, 17 and 20 separated to remove the molded shapes and clear the runners and the small pads behind each of the pistons. The three plates may be mounted on slides permitting them to return together in proper registration. Heretofore, thermosetting natural and synthetic rubber compounds have usually been molded by transfer molding presses and, as previously noted, with single cavity molds flash was not a great problem. In a transfer molding press, the sealing peripheries of the mold parts are inherently pressed together by the action of the plastic as the latter is transferred through the sprue to the mold cavity. In effect, the present invention provides in a compact unit what amounts to two or a large number of miniature transfer molding machines with each little unit presenting no particular problem of its own and while permitting avoidance of the plastic scrap loss involved by the large pad inherent to transfer molding operations.

Injection molding machines are conventionally supplied with adequate hydraulic control circuits and therefore no effort is made here to disclose corresponding arrangements. Obviously the new mold may be used with any injection molding machine capable of using a single cavity mold and handling the plastic to be molded. Correspondingly, with the slight modification of providing the necessary passages through the plate 23, the mold may even be used for transfer molding machine operations if the large scrap loss then involved is not considered to be objectionable.

The interfacing surfaces of all three of the plates are flat other than described, so that they form a rigid stack. The pistons are only very slightly shorter than their cylinders, so only their pads of waste material are formed on their tops.

Various changes not illustrated may be made in the construction of the parts described herein. For example, the plate 20 might be possibly more easily made if in the form of an inner plate lamination that is bored clear through for receiving the inserts 28 and is backed up by an outer plate lamination, whereby to form the recesses 29. The number of O-rings used to seal the pistons might be multiplied providing the pistons are left free to rock. Joints through which the plastic might flash should be kept at a minimum. Therefore, the plates 17 and 23 might be an integral unit, particularly when the mold is to be used in a transfer molding machine where the runners would not be required. There may be other possible changes in the design shown.

What is claimed is:

1. A plastic molding machine including a plurality of cylinders, a reciprocative piston in each of the cylinders, a first cylinder head for one end of each cylinder, in each instance the adjacent end of the piston in the cylinder and this cylinder head being formed to cooperatively form a mold cavity surrounded by portions which seal together when the piston is pressed towards this cylinder head, a second cylinder head for the other end of each cylinder and confining a space open to the end of the piston therein adjacent to this second head, a source of plastic under pressure, and means for feeding the plastic from said source to all of said spaces to press all of the pistons towards the first cylinder head in each instance, each piston having a plastic passage for transferring the plastic from said space to said cavity within the confines of said sealing portions.

2. The machine of claim 1 in which at least one piston has an encircling rib slidingly bearing on the cylinder in which it reciprocates and is otherwise slightly spaced from this cylinder so it can rock slightly to fit said sealing portions together, this rib being located adjacent to the cavity-forming end of the piston and the latter having means adjacent to its other end for sealing the space between it and the cylinder while permitting the piston to so rock.

3. The machine of claim 1 in which at least one of the pistons fits its cylinder with clearance sufficient to prevent its binding due to thermal expansion effects, and has a piston ring fitting the cylinder plastic tightly.

4. The machine of claim 1 in which said cylinders comprise a first rigid plate having bores formed transversely therethrough to form said cylinders, and said first cylinder head comprises a second rigid plate clamped against this first plate to form said first cylinder heads, and the machine has means for clamping these two plates separably together.

5. The machine of claim 4 in which said second plate has recesses formed therein in registration with said cylinders and has inserts removably fixed therein, said pistons being removable from said cylinders, whereby the inserts and pistons may be substituted by others defining mold cavities of different shapes.

6. The machine of claim 4 in which said second cylinder heads are formed by a third rigid plate adapted to be clamped to said first plate on its side opposite to that to which said second plate is clamped, said clamping means being for clamping all three of said plates separably together.

7. The machine of claim 6 in which said third plate has a plastic passage formed therethrough for receiving said plastic and passing it to the inner face of this third plate, the latter having runners formed therein and running from said passage to each of said cylinders, the interfaces of said first plate and this third plate otherwise substantially intercontacting.

8. The machine of claim 7 in which said pistons each has a length approaching the thickness of said first plate so that when these pistons are pressed towards said second cylinder heads only small spaces are formed between them and said third plate, the latter's said inner face being flat excepting for said runners.

References Cited in the file of this patent
UNITED STATES PATENTS

| | | |
|---|---|---|
| 2,277,599 | McGinnis | Mar. 24, 1942 |
| 2,777,164 | Strahm | Jan. 15, 1957 |
| 2,894,284 | Allison et al. | July 14, 1959 |